US010284123B2

(12) United States Patent
Mizukami et al.

(10) Patent No.: US 10,284,123 B2
(45) Date of Patent: May 7, 2019

(54) MOTOR UNIT

(71) Applicant: NIDEC SERVO CORPORATION, Kiryu-shi, Gunma (JP)

(72) Inventors: Koji Mizukami, Kiryu (JP); Masatomo Ishikawa, Kiryu (JP)

(73) Assignee: NIDEC SERVO CORPORATION, Gunma (JP)

( * ) Notice: Subject to any disclaimer, the term of this patent is extended or adjusted under 35 U.S.C. 154(b) by 0 days.

(21) Appl. No.: 15/753,176

(22) PCT Filed: Jul. 20, 2016

(86) PCT No.: PCT/JP2016/071211
§ 371 (c)(1),
(2) Date: Feb. 16, 2018

(87) PCT Pub. No.: WO2017/029925
PCT Pub. Date: Feb. 23, 2017

(65) Prior Publication Data
US 2018/0248503 A1 Aug. 30, 2018

(30) Foreign Application Priority Data
Aug. 18, 2015 (JP) ................. 2015-161284

(51) Int. Cl.
*H02P 6/28* (2016.01)
*H02P 27/08* (2006.01)
(52) U.S. Cl.
CPC ............... *H02P 6/28* (2016.02); *H02P 27/08* (2013.01)

(58) Field of Classification Search
CPC .......... H02P 27/08; H02P 6/28; H02P 29/032; H02P 7/29
See application file for complete search history.

(56) References Cited

U.S. PATENT DOCUMENTS 4,554,999 A * 11/1985 Kamaike ............... H02J 7/0078
187/290
5,343,382 A 8/1994 Hale et al.
(Continued)

FOREIGN PATENT DOCUMENTS

| JP | 11-103585 A | 4/1999 |
|----|----|----|
| JP | 2002-072773 A | 3/2002 |
| JP | 2015-122883 A | 7/2015 |

OTHER PUBLICATIONS

Official Communication issued in International Patent Application No. PCT/JP2016/071211, dated Oct. 4, 2016.

*Primary Examiner* — Thai T Dinh
(74) *Attorney, Agent, or Firm* — Keating & Bennett, LLP

(57) ABSTRACT

A motor unit includes a motor; a driving circuit that supplies a driving current to the motor; a shunt resistor; a rotation command input terminal; a pulse output terminal; a current detection unit detects a driving current measured by the shunt resistor; a driving control unit that controls supplying of the driving current; a storage unit that previously stores allowable range information; a current value determination unit that determines whether or not the current value of the driving current is included in the allowable range, and the allowable range information stored in the storage unit; and a signal generation unit that generates the pulse signal by setting a duty ratio of the pulse signal as a first duty ratio, and setting the duty ratio of the pulse signal as a second duty ratio different from the first duty ratio.

5 Claims, 8 Drawing Sheets

(56) References Cited

U.S. PATENT DOCUMENTS

| | | | | |
|---|---|---|---|---|
| 5,723,968 | A * | 3/1998 | Sakurai | B66B 1/30 |
| | | | | 187/293 |
| 6,008,601 | A * | 12/1999 | Sugiyama | B60L 3/0023 |
| | | | | 318/254.2 |
| 6,958,589 | B2 * | 10/2005 | Kawaji | H02P 27/045 |
| | | | | 318/438 |
| 7,113,414 | B2 * | 9/2006 | Matsushiro | H02M 5/458 |
| | | | | 318/801 |
| 10,079,556 | B2 * | 9/2018 | Ichikawa | H02M 7/48 |
| 10,148,203 | B2 * | 12/2018 | Matsumoto | H02M 7/003 |
| 2007/0058404 | A1 | 3/2007 | Yaguchi | |
| 2012/0181964 | A1 | 7/2012 | Flanary et al. | |
| 2013/0033209 | A1 * | 2/2013 | Murata | H02P 23/14 |
| | | | | 318/400.06 |
| 2013/0043817 | A1 * | 2/2013 | Shibuya | H02P 6/182 |
| | | | | 318/400.33 |

\* cited by examiner

44

| STAGE CL OF DRIVING CURRENT VALUE DI | RANGE OF DRIVING CURRENT VALUE DI | DUTY RATIO OF PULSE |
|---|---|---|
| CL2 | THRESHOLD VALUE th1 ≤ DRIVING CURRENT VALUE DI | 50% |
| CL1 | DRIVING CURRENT VALUE DI > THRESHOLD VALUE th1 | 75% |

Fig.3

| STAGE CL OF DRIVING CURRENT VALUE DI | RANGE OF DRIVING CURRENT VALUE DI | DUTY RATIO OF PULSE |
|---|---|---|
| CL3 | THRESHOLD VALUE th2 $\leq$ DRIVING CURRENT VALUE DI | 25% |
| CL2 | THRESHOLD VALUE th1 $\leq$ DRIVING CURRENT VALUE DI $<$ THRESHOLD VALUE th2 | 50% |
| CL1 | DRIVING CURRENT VALUE DI $<$ THRESHOLD VALUE th1 | 75% |

MOTOR UNIT

BACKGROUND OF THE INVENTION

1. Field of the Invention

The present disclosure relates to a motor unit.

2. Description of the Related Art

In the related art, there have been cases where a rotation state of a motor is detected by measuring a driving current of the motor with a shunt resistor or the like. In this case, a technique for determining whether the rotation state of the motor is within a proper range or not is known. For example, Japanese Unexamined Patent Application Publication No. 2002-72773 is known.

However, in the technique disclosed in Japanese Unexamined Patent Application Publication No. 2002-72773, it was not taken into consideration how to transmit the determination result to the outside of a motor unit as to whether the rotation state of the motor is within the proper range or not. Here, in order to transmit the determination result to the outside of the motor unit, an output terminal dedicated to the determination result may be provided. However, in this case, there was a problem in that the terminal is added, and thus it is not possible to simplify the configuration of the motor unit. In other words, according to the technique disclosed in Japanese Unexamined Patent Application Publication No. 2002-72773, there was a problem in that it is not possible to simplify a configuration for transmitting the determination result in the rotation state of the motor in the motor unit to the outside.

SUMMARY OF THE INVENTION

According to an aspect of the present disclosure, a motor unit includes a motor, a driving circuit that supplies a driving current to the motor, a shunt resistor that measures the driving current, a rotation command input terminal that supplies a rotation command signal of the motor, a pulse output terminal that outputs a pulse signal indicating a rotation state of the motor, a current detection unit detects the driving current measured by the shunt resistor, a driving control unit that controls supplying of the driving current based on the rotation command signal supplied to the rotation command input terminal, a storage unit that previously stores allowable range information indicating an allowable range of a current value of the driving current detected by the current detection unit, a current value determination unit that determines whether or not the current value of the driving current is included in the allowable range based on the current value of the driving current detected by the current detection unit, and the allowable range information stored in the storage unit, and a signal generation unit that generates the pulse signal by setting a duty ratio of the pulse signal as a first duty ratio in a case where the current value determination unit determines that the current value of the driving current is within the allowable range, and setting the duty ratio of the pulse signal as a second duty ratio different from the first duty ratio in a case where the current value determination unit determines that the current value of the driving current is out of the allowable range.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a table illustrating an example of allowable range information stored in a storage unit.

FIG. 7 is a table illustrating Modification Example of allowable range information stored in the storage unit.

DETAILED DESCRIPTION OF THE PREFERRED EMBODIMENTS

Hereinafter, an embodiment of a motor unit of the present disclosure will be described with reference the drawings. Note that, the scope of the present disclosure is not limited to the following embodiment, and can be optionally changed within the scope of the technical idea of the present disclosure.

Figure 1:
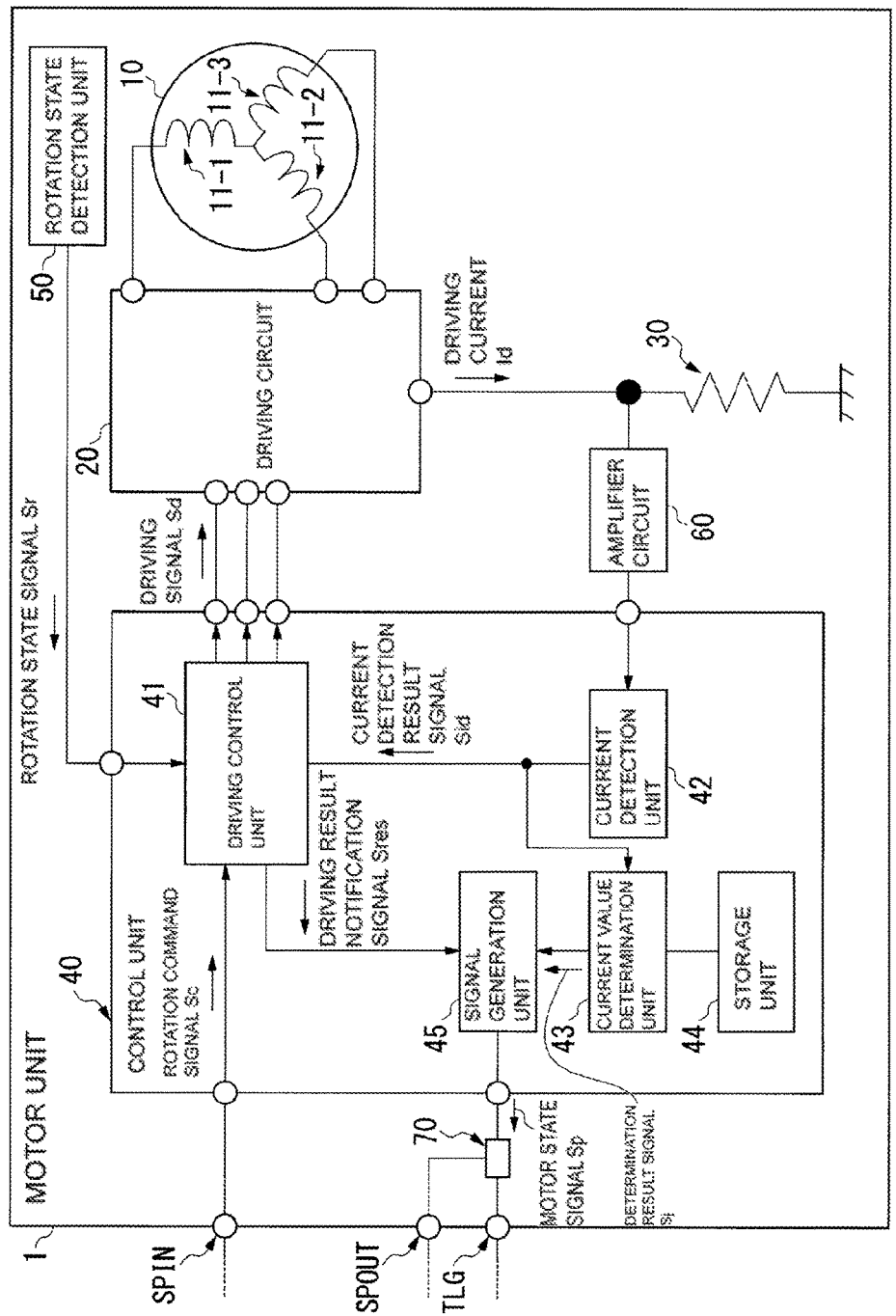
FIG. 1 is a diagram illustrating an embodiment of the present disclosure, which is a block diagram illustrating an example of a functional configuration of a motor unit.

FIG. 1 is a block diagram illustrating an example of a functional configuration of a motor unit 1. The motor unit 1 is provided with a motor 10, a driving circuit 20, a shunt resistor 30, a control unit 40, a rotation state detection unit 50, an amplifier circuit 60, a rotation command input terminal SPIN, and a pulse output terminal SPOUT.

The motor 10 is provided with coils 11-1 to 11-3. The motor 10 rotates a rotor (not shown) by a driving current Id supplied to the coils 11-1 to 11-3. Note that, an example of a case where the motor 10 is a three-phase DC brushless motor with sensor; however the kinds of the motor 10 are not limited thereto.

The driving circuit 20 supplies a driving current Id to the motor 10 based on the control of the control unit 40. Specifically, the driving circuit 20 is provided with a three-phase full bridge driver (not shown), and supplies the driving current Id to the coils 11-1 to 11-3 of the motor 10. In addition, the driving circuit 20 allows the driving current Id supplied from the coils 11-1 to 11-3 to flow with the shunt resistor 30. The shunt resistor 30 measures the driving current Id flowing from the driving circuit 20. The amplifier circuit 60 is connected to both ends of the shunt resistor 30 and amplifies the potential difference between both ends of the shunt resistor 30. The amplifier circuit 60 outputs the amplified potential difference between both ends of the shunt resistor 30 to the control unit 40.

The rotation state detection unit 50 is provided with a hall element (not shown), and detects a rotational position of the rotor of the motor 10. The rotation state detection unit 50 outputs a rotation state signal Sr indicating the detected rotational position of the rotor to the control unit 40. Note that, the rotation state detection unit 50 is not necessary depending on the kinds of the motor 10.

The control unit 40 is provided with a CPU (Central Processing Unit) and the like; for example, a driving control unit 41, a current detection unit 42, a current value determination unit 43, a storage unit 44, and a signal generation unit 45 as function units thereof.

The current detection unit 42 detects the current flowing the shunt resistor 30 based on the potential difference between both ends of the shunt resistor 30 output from the amplifier circuit 60. That is, the current detection unit 42 detects a driving current Id measured by the shunt resistor 30. The current detection unit 42 outputs a current detection result signal Sid indicating the detection result of the driving current Id to the driving control unit 41.

The driving control unit 41 generates a driving signal Sd based on a rotation command signal Sc, a rotation state signal Sr, and a current detection result signal Sid, and then outputs the generated driving signal Sd to the driving circuit 20. Here, the rotation command signal Sc is a signal supplied from other devices to the rotation command input terminal SPIN. The rotation command signal Sc includes a signal indicating the rotation and stop of the motor 10. Note that, the rotation command signal Sc may include a signal indicating the rotation speed of the motor 10. In the following description, an example of a case where the rotation command signal Sc is a signal that indicates the rotation speed of the motor 10, in which 0 [r/s] indicates the stop of the motor 10 and values other, 0 [r/s] indicates a target rotation speed of the motor 10 will be described.

The driving control unit 41 generates the driving result notification signal Sres, and outputs the generated driving result notification signal Sres to the signal generation unit 45. Here, the driving result notification signal Sres is a signal generated based on the rotation state signal Sr and the current detection result signal Sid. As one example, the driving control unit 41 calculates a torque of the motor 10 based on the current detection result signal Sid, and outputs the signal indicating the calculated torque to the signal generation unit 45 as a driving result notification signal Sres. Further, as another example, the driving control unit 41 calculates the rotation speed of the motor 10 based on the rotation state signal Sr, and outputs the signal indicating the calculated rotation speed to the signal generation unit 45 as a driving result notification signal Sres. In the following description, an example of a case where the driving control unit 41 outputs the signal indicating the rotation speed of the motor 10 as the driving result notification signal Sres will be described.

The signal generation unit 45 generates the motor state signal Sp based on driving result notification signal Sres output from the driving control unit 41. In addition, the signal generation unit 45 outputs the generated motor state signal Sp to the pulse output terminal SPOUT via a pulse signal output circuit 70. An example of the pulse signal output circuit 70 will be described with reference to FIG. 2.

Figure 2:
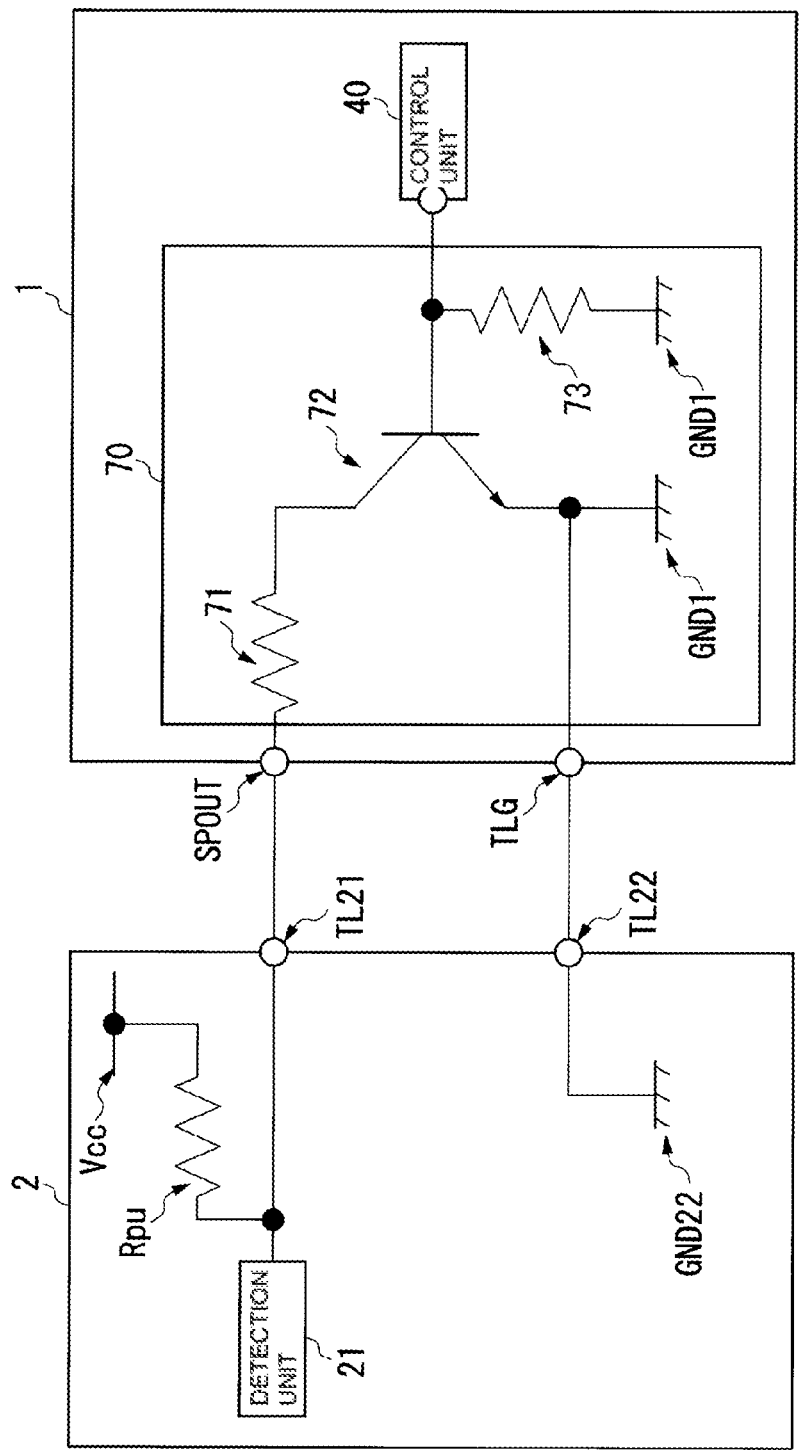
FIG. 2 is a diagram illustrating an example of a circuit configuration of a pulse signal output circuit.

FIG. 2 is a diagram a diagram illustrating an example of a circuit configuration of a pulse signal output circuit 70. In this example, the motor unit 1 is connected to a control unit 2. The control unit 2 is provided with a detection unit 21. The detection unit 21 detects the motor state signal Sp output from the pulse output terminal SPOUT. The motor unit 1 is provided with a ground terminal TLG in addition to the pulse output terminal SPOUT. A terminal TL21 of the control unit 2 is connected to the pulse output terminal SPOUT. In addition, a terminal TL22 of the control unit 2 is connected to the ground terminal TLG. A voltage is supplied to the pulse output terminal SPOUT from a supply voltage Vcc of the control unit 2 via a pull-up resistor Rpu.

The pulse signal output circuit 70 is provided with a current limiting resistor 71, a transistor 72, and a base resistor 73, which is a so-called an open collector type output circuit. The pulse signal output circuit 70 generates a pulse signal by turning on or off the transistor 72 based on the motor state signal Sp output from the control unit 40. The pulse signal output circuit 70 transmits the state of the motor 10 to the control unit 2 from the motor unit 1 by using the generated pulse signal.

Returning to FIG. 1, the signal generation unit 45 generates the motor state signal Sp based on driving result notification signal Sres output from the driving control unit 41. In this example, the signal generation unit 45 determines a pulse cycle according to the rotation speed of the motor 10 indicated by the driving result notification signal Sres. The signal generation unit 45 outputs the determined pulse cycle to the pulse signal output circuit 70 as the motor state signal Sp. The transistor 72 of the pulse signal output circuit 70 is turned on or off according to the pulse cycle of the motor state signal Sp. With such a configuration, the pulse signal cycle according to the rotation speed of the motor 10 is output from the pulse output terminal SPOUT.

The current value determination unit 43 acquires the current detection result signal Sid from the current detection unit 42. The current value determination unit 43 determines whether the current value of the detected driving current Id is within an allowable range or not based on the acquired current detection result signal Sid, and the allowable range information stored in the storage unit 44. The allowable range information stored in the storage unit 44 will be described with reference to FIG. 3. Note that, in the following description, the current value of the driving current Id is also referred to as a driving current value DI.

FIG. 3 is a table illustrating an example of allowable range information stored in the storage unit 44. In this example, the allowable range information is associated with a stage CL of the driving current value DI, the driving current value DI, and a duty ratio of the pulse. The stage CL includes a stage CL1 and a stage CL2. The stage CL1 is associated with a relation of driving current value DI<threshold value th1. The stage CL2 is associated with a relation of threshold value th1≤driving current value DI. Here, threshold value th1 is a value for distinguishing whether or not the driving current value DI is within the allowable range. Here, in a case of the stage CL1, that is, in a case of the relation of driving current value DI<threshold value th1, the driving current value DI is out of the allowable range. Further, in a case of the stage CL2, that is in a case where the relation of threshold value th1≤driving current value DI, the driving current value DI is within the allowable range. In addition, the stage CL1 is associated with 75% duty ratio of the pulse. The stage CL2 is associated with 50% duty ratio of the pulse.

Returning to FIG. 1, the current value determination unit 43 determines whether or not the driving current value DI indicated by the acquired current detection result signal Sid corresponds to the stage CL in any of the allowable range information. Specifically, in a case where the driving current value DI is less than the threshold value th1, the current value determination unit 43 determines that the driving current value DI is the stage CL1. In addition, in a case where the driving current value DI is equal to or greater than the threshold value th1, the current value determination unit 43 determines that the driving current value DI is the stage CL2. The current value determination unit 43 outputs the duty ratio of the pulse corresponding to the determined stage CL to the signal generation unit 45 as a determination result signal Sj. Specifically, the current value determination unit 43 outputs 75% duty ratio of the pulse to the signal generation unit 45 as the determination result signal Sj in a case there the driving current value DI is determined as the stage CL1. In addition, the current value determination unit 43 outputs 50% duty ratio of the pulse to the signal generation unit 45 as the determination result signal Sj in a case there the driving current value DI is determined as the stage CL2. The signal generation unit 45 determines the duty ratio of the pulse of the motor state signal Sp output to the pulse signal output circuit 70 based on the determination result signal Sj output from the current value determination unit 43.

As described above, the signal generation unit 45 determines the pulse cycle of the motor state signal Sp based on driving result notification signal Sres output from the driving control unit 41. In addition, the signal generation unit 45 determines the duty ratio of the pulse of the motor state signal Sp based on the determination result signal Sj output from the current value determination unit 43. That is, the signal generation unit 45 outputs the driving result of the motor 10 by the pulse cycle, and the determination result of the driving current value DI by the duty ratio of the pulse, from the pulse output terminal SPOUT.

Figure 4:
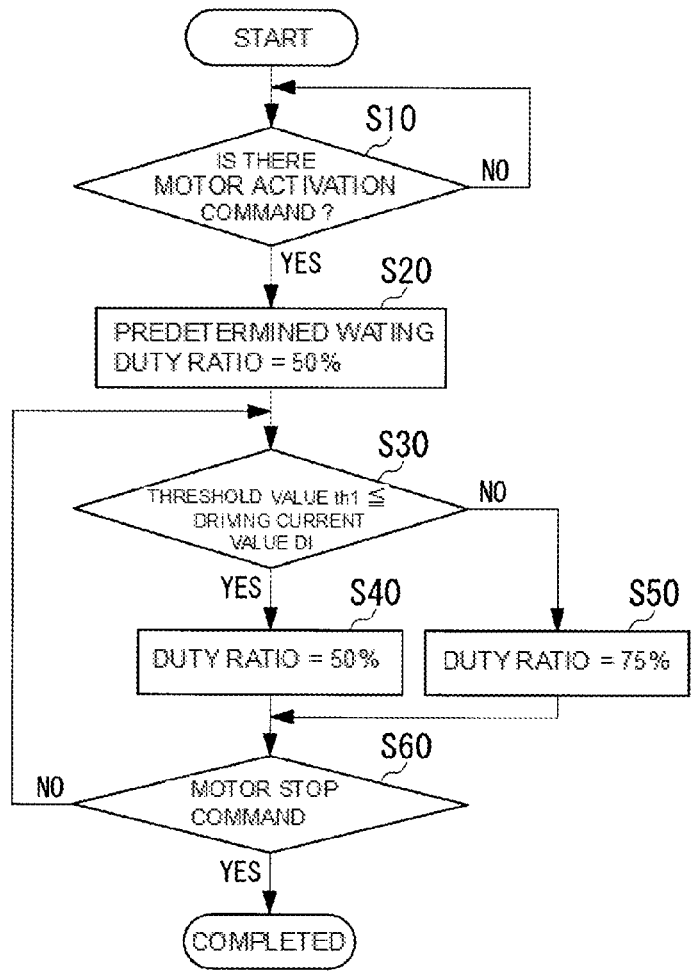
FIG. 4 is a flow chart illustrating an example of an operation of a control unit.

Next, an example of an operation of the control unit 40 will be described with reference to FIG. 4. FIG. 4 is a flow chart illustrating an example of an operation of the control unit 40. The driving control unit 41 acquires the rotation command signal Sc to be supplied to the rotation command input terminal SPIN. The driving control unit 41 determines presence or absence of an activation command of the motor 10 based on the acquired rotation command signal Sc (step S10). In this example, the driving control unit 41 determines that there is no activation command of the motor 10 in a case where the rotation command signal Sc indicates 0 [r/s]. Note that, the activation command of the motor 10 is a command for change a state where the motor 10 is stopped to a state the motor 10 is rotated. The driving control unit 41 determines that there is the activation command of the motor 10 in a case where the value of the rotation command signal Sc is changed from 0 [r/s] to a value of equal to or greater than 0 [r/s]. In the case where it is determined that there is no activation command of the motor 10 (step S10; NO), the driving control unit 41 returns the process to step S10, and continuously performs the determination of the activation command of the motor 10. In the case where it is determined that there is the activation command of the motor 10 (step S10; YES), the driving control unit 41 proceeds the process to step S20.

Here, the driving control unit 41 acquires the rotation state signal Sr output from the rotation state detection unit 50. The driving control unit 41 generates the driving signal Sd based on the acquired rotation state signal Sr. The driving control unit 41 rotates the motor 10 by supplying the generated driving signal Sd to the driving circuit 20. Further, the driving control unit 41 generates the driving result notification signal Sres based on the rotation state signal Sr and the current detection result signal Sid, and supplies the generated driving result notification signal Sres to the signal generation unit 45.

In addition, the current value determination unit 43 determines whether the driving current value DI is within the allowable range or not based on the current detection result signal Sid output from the current detection unit 42 and the allowable range information stored in the storage unit 44. The current value determination unit 43 outputs the determination result signal Sj indicating the duty ratio of the pulse to the signal generation unit 45 based on the above determination result. Here, the current value determination unit 43 outputs the determination result signal Sj indicating 50% duty ratio of the pulse until a predetermined time TW elapses after the activation of the motor 10, regardless of whether or not the driving current value DI is within the allowable range. The predetermined time TW will be described with reference to FIG. 5.

Figure 5:
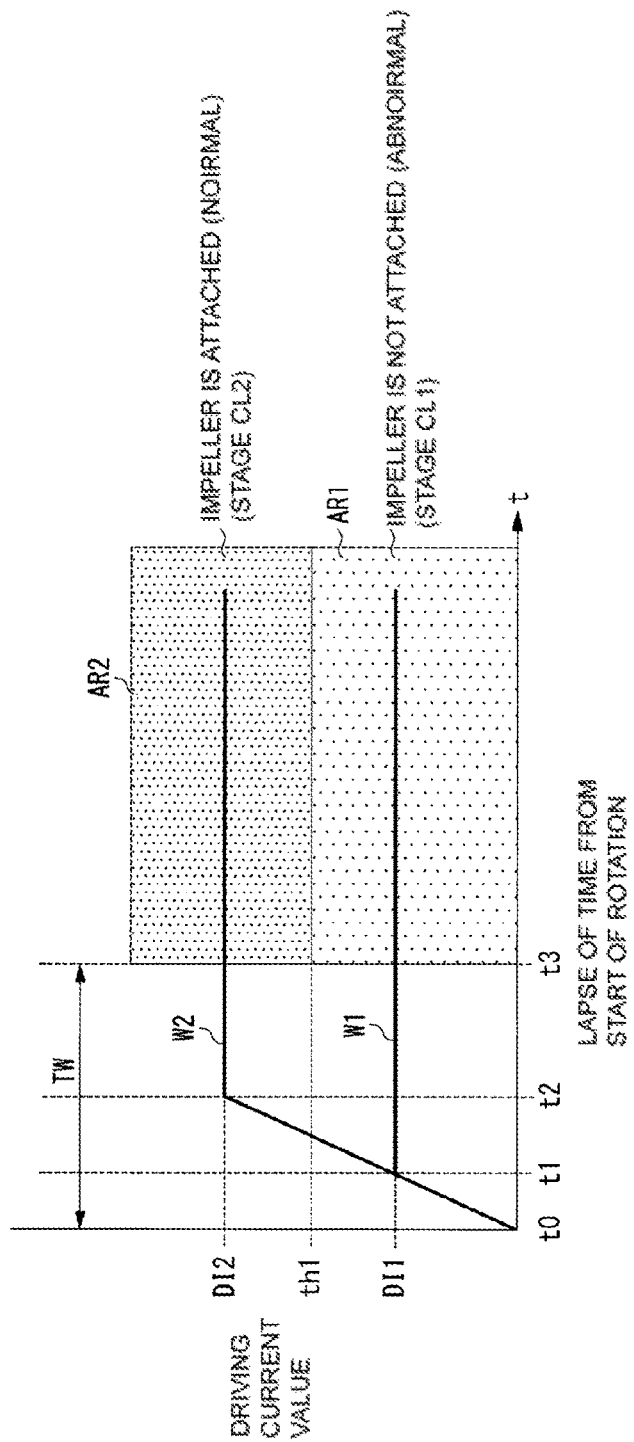
FIG. 5 is a graph illustrating an example of a waveform of the driving current value of the motor.

FIG. 5 is a graph illustrating an example of a waveform of the driving current value DI of the motor 10. When the driving control unit 41 supplies the driving current to the motor 10 via the driving circuit 20, the motor 10 starts the rotation (time t0). The driving control unit 41 calculates the rotation speed of the motor 10 based on the rotation state signal Sr output from the rotation state detection unit 50. The driving control unit 41 maintains the driving current value DI at a constant value when the calculated rotation speed reaches the target rotation speed indicated by the rotation command signal Sc.

As an example, a case where the motor unit 1 is a fan motor unit. In this case, the motor 10 rotates an impeller (not shown). In a case where the impeller is attached to the motor 10, a load torque is larger than a case where the impeller is not attached. Therefore, in a case where the motor 10 is rotated at a certain rotation speed, the driving current value DI2 in the case where the impeller is attached to the motor 10 is larger than the driving current value DI1 in the case where the impeller is not attached. A waveform W2 of the driving current value DI in the case where the impeller is not attached to the motor 10 is illustrated in FIG. 5. That is, the motor 10 reaches to the target rotation speed at time t2. The driving control unit 41 maintains the driving current value DI at the driving current value DI2 after time t2. In addition, a waveform W1 of the driving current value DI in the case where the impeller is not attached to the motor 10 is illustrated in FIG. 5. That is, the motor 10 reaches to the target rotation speed at time t1. The driving control unit 41 maintains the driving current value DI at the driving current value DI1 after time t1.

In the waveform W1 and the waveform W2 illustrated as the above example, a transient state is from time t0 to time t2, and a normal state is after time t2. In the normal state, as compared to the transient state, the waveform W1 and the waveform W2 are easily distinguished from each other. In this regard, the current value determination unit 43 determines whether the driving current value DI is within the allowable range or not in the normal state. In the example illustrated in FIG. 5, the allowable range is a range AR2 after time t3, in which the driving current value DI is equal to or greater than the threshold value th1. Here, when the predetermined time TW is set to be from time t0 to time t3, the allowable range, that is, the range AR2 is a range after the lapse of the predetermined time TW, in which the driving current value DI is equal to or greater than the threshold value th1. Further, the range AR1 is a range after the lapse of the predetermined time TW, in which the threshold value th1 is larger than the driving current value DI.

The current value determination unit 43 determines that the driving current value DI is within the allowable range in a case where the driving current value DI is equal to or greater than the threshold value th1 after the lapse of the predetermined time TW. In addition, the current value determination unit 43 determines that the driving current value DI is out of the allowable range in a case where the driving current value DI is less than the threshold value th1 after the lapse of the predetermined time TW.

Returning to FIG. 4, the current value determination unit 43 waits the process until the predetermined time TW elapses from the activation of the motor 10 (step S20). In this step S20, the current value determination unit 43 outputs the determination result signal Sj indicating 50% duty ratio of the pulse. The current value determination unit 43 proceeds the process to step S30 when the predetermined time TW elapses from the activation of the motor 10.

The current value determination unit 43 compares the driving current value DI with the threshold value th1 (step S30). The current value determination unit 43 outputs the determination result signal Sj indicating 50% duty ratio of the pulse in a case where it is determined that the driving current value DI is equal to or greater than the threshold value th1 (step S30; YES) (step S40). In addition, the current value determination unit 43 outputs the determination result signal Sj indicating 75% duty ratio of the pulse in a case where it is determined that the driving current value DI is not equal to or greater than the threshold value th1 (step S30; NO) (step S50).

The signal generation unit 45 generates the motor state signal Sp based on driving result notification signal Sres output from the driving control unit 41 and the determination result signal Sj output from the current value determination unit 43. The signal generation unit 45 outputs the generated motor state signal Sp to the pulse output terminal SPOUT via a pulse signal output circuit 70. An example of the waveform of the motor state signal Sp will be described with reference to FIG. 6.

Figure 6:
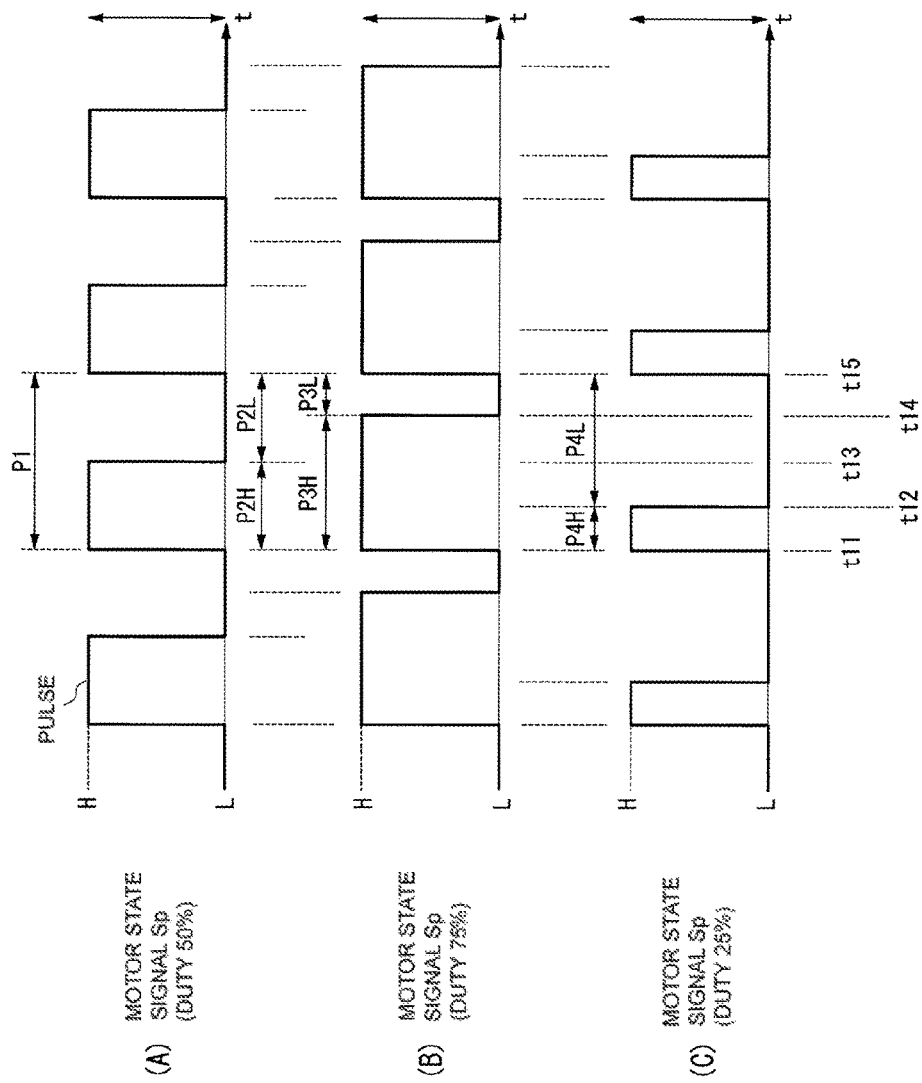
FIG. 6 is a graph illustrating an example of a waveform of a motor state signal.

FIG. 6 is a graph illustrating an example of a waveform of a motor state signal Sp. When acquiring the determination result signal Sj indicating 50% duty ratio of the pulse from the current value determination unit 43, the signal generation unit 45 outputs the motor state signal Sp as illustrated in (A) of FIG. 6. Specifically, the signal generation unit 45 outputs the motor state signal Sp in which a period P1 from time t11 to time t15 is set as one cycle. Here, in the case of 50% duty ratio of the pulse, regarding the waveform of the motor state signal Sp, the signal generation unit 45 sets a period P2H from time t11 to time t13 as H (high) and a period P2L from time t13 to time t15 as L (low). In addition, when acquiring the determination result signal Sj indicating 75% duty ratio of the pulse from the current value determination unit 43, the signal generation unit 45 outputs the motor state signal Sp as illustrated in (B) of FIG. 6. Specifically, in the case of 75% duty ratio of the pulse, regarding the waveform of the motor state signal Sp, the signal generation unit 45 sets a period P3H from time t11 to time t14 as H (high) and a period P3L from time t14 to time t15 as L (low).

The control unit 40 determines whether or not the rotation command signal Sc acquired from the rotation command input terminal SPIN illustrates the stop of the motor 10 (step S60). The control unit 40 continuously performs the process by returning the process to step S30 in a case where the rotation command signal Sc does not indicate the stop (step S60; NO). Further, in a case where the rotation command signal Sc does not indicate the stop (step S60; YES), the control unit 40 completes the process.

As described above, the motor unit 1 sets the duty ratio of the motor state signal Sp as a first duty ratio in a case where the current value determination unit 43 determines that the driving current value DI is within the allowable range. In addition, in a case where the current value determination unit 43 determines that the driving current value DI is out of the allowable range, the motor unit 1 sets the duty ratio of the motor state signal Sp as a second duty ratio which is different from the first duty ratio. Here, the motor state signal Sp is also a signal that transmits the rotation state of the motor 10, for example, the rotation speed of the motor 10 to the outside by the pulse cycle thereof. In other words, the motor state signal Sp transmits two kinds of information to the unit outside by the pulse cycle and the duty ratio. That is, the motor unit 1 can output two kinds of information from one pulse output terminal SPOUT. That is, according to the motor unit 1, it is possible to transmit the determination result of the rotation state of the motor 10 to the outside without adding a terminal, so that the configuration can be simplified as compared with the case where the terminal is added.

Further, the allowable range information stored in the storage unit 44 indicates that the driving current value DI in the case where the motor 10 rotates with an appropriate load is within the allowable range, and the driving current value DI in the case where the motor 10 rotates with a load lower than the appropriate load is out of the allowable range. With such a configuration, the motor unit 1 can determine whether or not the load is appropriately applied to the motor 10. For example, in a case where the motor unit 1 is a fan motor unit, the motor unit 1 can determine whether or not the impeller is attached to the motor 10. Specifically, in a step of assembling the motor unit 1, in a case of forgetting to apply the load, the motor unit 1 determines that the motor 10 rates with a load lower than the appropriate load, and outputs the motor state signal of 75% duty ratio of the pulse. Here, the motor unit 1 outputs the motor state signal Sp from the pulse output terminal SPOUT to the outside. Therefore, according to the motor unit 1, it is possible to determine that applying the load to the motor 10 is forgotten, by the unit outside. For example, depending on the motor unit 1, it may be difficult to visually recognize from the outside that the load is not applied to the motor 10 in a state where the assembling is completed. Even in such a case, since the motor unit 1 outputs the determination result of the load to the pulse output terminal SPOUT, it is possible to determine from the outside that applying the load to the motor 10 is forgotten, by connecting a measuring device to the pulse output terminal SPOUT.

In addition, the motor unit 1 is provided with a pulse signal output circuit 70 as an example. Such a pulse signal output circuit 70 is an open collector type output circuit. Accordingly, an analog tester or a digital multimeter are set to resistance measurement mode, and the output of the pulse signal output circuit 70 is measured, thereby measuring the change of the duty ratio of the pulse. That is, according to the motor unit 1, it is possible to determine that applying the load to the motor 10 is forgotten, by the simple measuring device.

Modification Example of the motor unit 1 will be described with reference to FIG. 7 and FIG. 8. In this Modification Example, the allowable range information stored in the storage unit 44 does not have two stages, but has three stages, which is a different point from that of the above-described embodiment. FIG. 7 is a table illustrating Modification Example of allowable range information stored in the storage unit 44. In this Modification Example, the storage unit 44 stores a stage CL3 in addition to the stage CL1 and the stage CL2. The stage CL1 is associated with a relation of driving current value DI<threshold value th1 and 50% duty ratio of the pulse. The stage CL2 is associated with a relation of threshold value th1≤driving current value DI<threshold value th2, and 75% duty ratio of the pulse. The stage CL3 is associated with a relation of threshold value th2≤driving current value DI and 25% duty ratio of the pulse. In this Modification Example, in the case of the stage CL1 and the stage CL3, the driving current value DI is out of the allowable range. In addition, in the case of the stage CL2, the driving current value DI is within the allowable range. That is, in this Modification Example, the driving current value DI which is out of the allowable range is further divided into a plurality of duty ratios in accordance with the stage CL.

Figure 8:
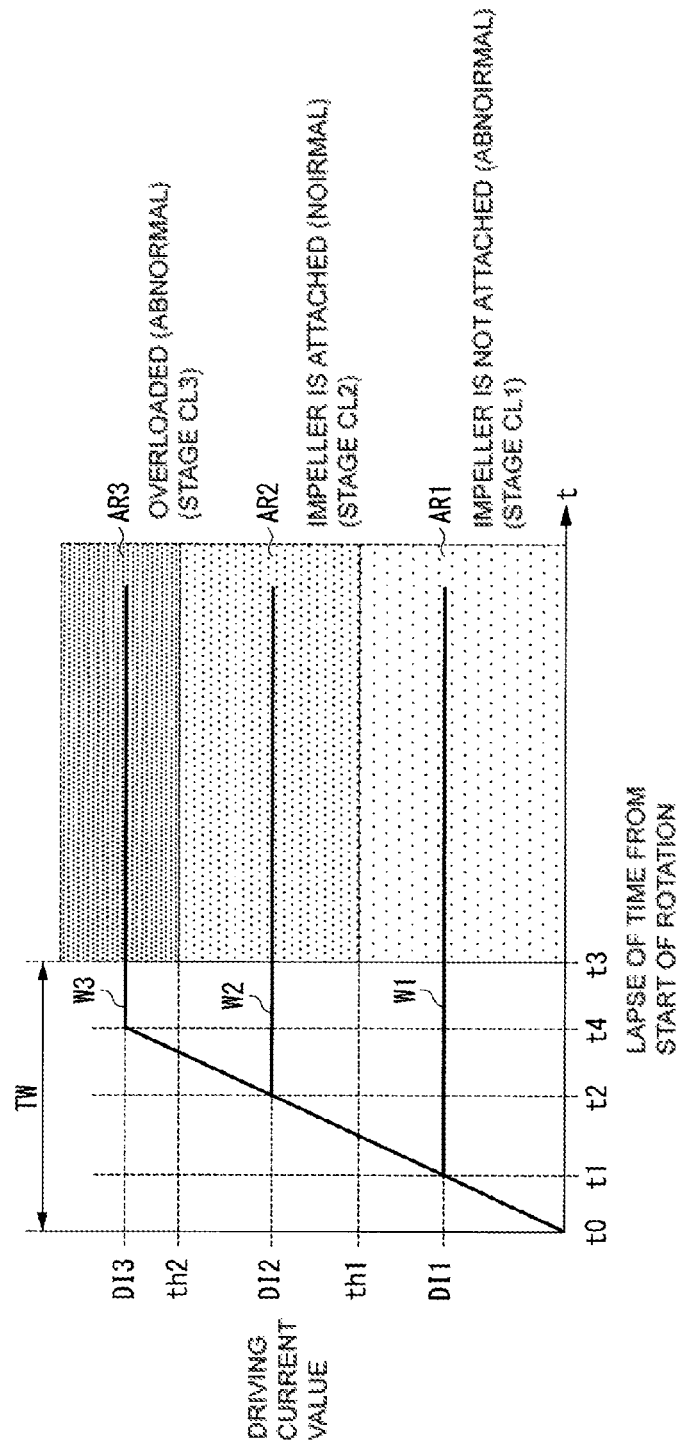
FIG. 8 is a graph illustrating Modification Example of a waveform of the driving current value of the motor.

FIG. 8 is a graph illustrating Modification Example of a waveform of the driving current value DI of the motor 10. As an example, a case where the motor unit 1 is a fan motor unit. In this case, the motor 10 rotates an impeller. This impeller may interfere with other parts and it may be difficult to rotate. In this case, the load torque is larger than a case where the impeller does not interfere with other parts, and thus is easy to rotate. Therefore, in a case where the motor 10 is rotated at a certain rotation speed, the driving current value DI3 in the case where the impeller interferes with the motor 10 is larger than the driving current value DI2 in the case where the impeller does not interfere. The driving control unit 41 in this Modification Example has a current limit function. Specifically, the driving control unit 41 suppresses the driving current value DI so as not to be equal to or greater than the driving current value DI3 in a case where the driving current value DI reaches the upper limit value of the driving current value DI3. A waveform W3 in a case where the impeller interferes with the motor 10 and thus the current limit function works is illustrated in FIG. 8. That is, the driving current value DI reaches the upper limit value at time t4. The driving control unit 41 maintains the driving current value DI at the driving current value DI3 after the time t4.

In the waveform W3 illustrated in this Modification Example, a transient state is from time t0 to time t4, and a normal state is after time t4. In the normal state, as compared to the transient state, the waveform W1, the waveform W2, and the waveform W3 are easily distinguished from each other. In this regard, the current value determination unit 43 determines whether the driving current value DI is within the allowable range or not in the normal state. In Modification Example illustrated in FIG. 8, a range AR3 after time t3, in which the driving current value DI is equal to or greater than the threshold value th2 is an overloaded range AR3.

The current value determination unit 43 determines that the driving current value DI belongs to the overloaded range AR3, that is, the driving current value DI is out of the allowable range in a case where the driving current value DI is equal to or greater than the threshold value th2 after the lapse of the predetermined time TW. In a case of determining that the driving current value DI belongs to the overloaded range AR3, the current value determination unit 43 outputs the determination result signal Sj illustrating 25% duty ratio of the pulse.

When acquiring the determination result signal Sj indicating 25% duty ratio of the pulse from the current value determination unit 43, the signal generation unit 45 outputs the motor state signal Sp as illustrated in (C) of FIG. 6. Specifically, in the case of 25% duty ratio of the pulse, regarding the waveform of the motor state signal Sp, the signal generation unit 45 sets a period P4H from time t11 to time t12 as H (high) and a period P4L from time t12 to time t15 as L (low).

As described above, in a case where the current value determination unit 43 determines that the driving current value DI is out of the allowable range, the signal generation unit 45 of the motor unit 1 generates the motor state signal Sp by setting the 75% duty ratio or 25% duty ratio as the duty ratio in accordance to the stage CL1 or the stage CL3 of the driving current value DI1. With such a configuration, the motor unit 1 can transmit not only whether or not the driving current value DI is within the allowable range, but also whether or not over and short of the load in the case where the driving current value DI is out of the allowable range is to be concerned, to the outside. That is, according to the motor unit 1, in the case where the driving current value DI is out of the allowable range, it is possible to transmit the situation to the outside in more detail.

In this Modification Example, a case where the stage CL of the driving current value DI is three-stage has been described as an example, but the present disclosure is not limited to this. For example, the stage CL of the driving current value DI may be divided into four or more stages.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor unit comprising:
a motor;
a driving circuit that supplies a driving current to the motor;
a shunt resistor that measures the driving current;
a rotation command input terminal that supplies a rotation command signal of the motor;
a pulse output terminal that outputs a pulse signal indicating a rotation state of the motor;
a current detection unit detects the driving current measured by the shunt resistor;
a driving control unit that controls supplying of the driving current based on the rotation command signal supplied to the rotation command input terminal;
a storage unit that previously stores allowable range information indicating an allowable range of a current value of the driving current detected by the current detection unit;
a current value determination unit that determines whether or not the current value of the driving current is included in the allowable range based on the current value of the driving current detected by the current detection unit, and the allowable range information stored in the storage unit; and
a signal generation unit that generates the pulse signal by setting a duty ratio of the pulse signal as a first duty ratio in a case where the current value determination unit determines that the current value of the driving current is within the allowable range, and setting the duty ratio of the pulse signal as a second duty ratio different from the first duty ratio in a case where the current value determination unit determines that the current value of the driving current is out of the allowable range; wherein
the duty ratio of the pulse signal corresponds to a determination result of the current value determination unit, and
a cycle of the pulse signal corresponds to the rotation state of the motor.

2. The motor unit according to claim 1,
wherein the allowable range information indicates that the current value of the driving current in a case where the motor rotates with an appropriate load is within the allowable range, and the current value of the driving current in a case where the motor rotates with a load lower than the appropriate load is out of the allowable range.

3. The motor unit according to claim 2, wherein the motor unit determines whether or not an impeller is attached to the motor by detecting whether the current value of the driving current is included in the allowable range with an appropriate load being applied to the motor.

4. The motor unit according to claim 1, wherein the second duty ratio is further divided into a plurality of duty ratios in accordance with a stage of the current value of the driving current, and the signal generation unit generates the pulse signal by setting any of the second duty ratio as a duty ratio in accordance with the stage of the current value of the driving current in a case where the current value determination unit determines that the current value of the driving current is out of the allowable range.

5. The motor unit according to claim 1, wherein the pulse output terminal is connected to a pulse signal output circuit driven by the driving control unit.

* * * * *